G. A. PADDOCK.
CLOTHES WRINGER.
APPLICATION FILED JAN. 29, 1907.
1,007,964.
Patented Nov. 7, 1911.
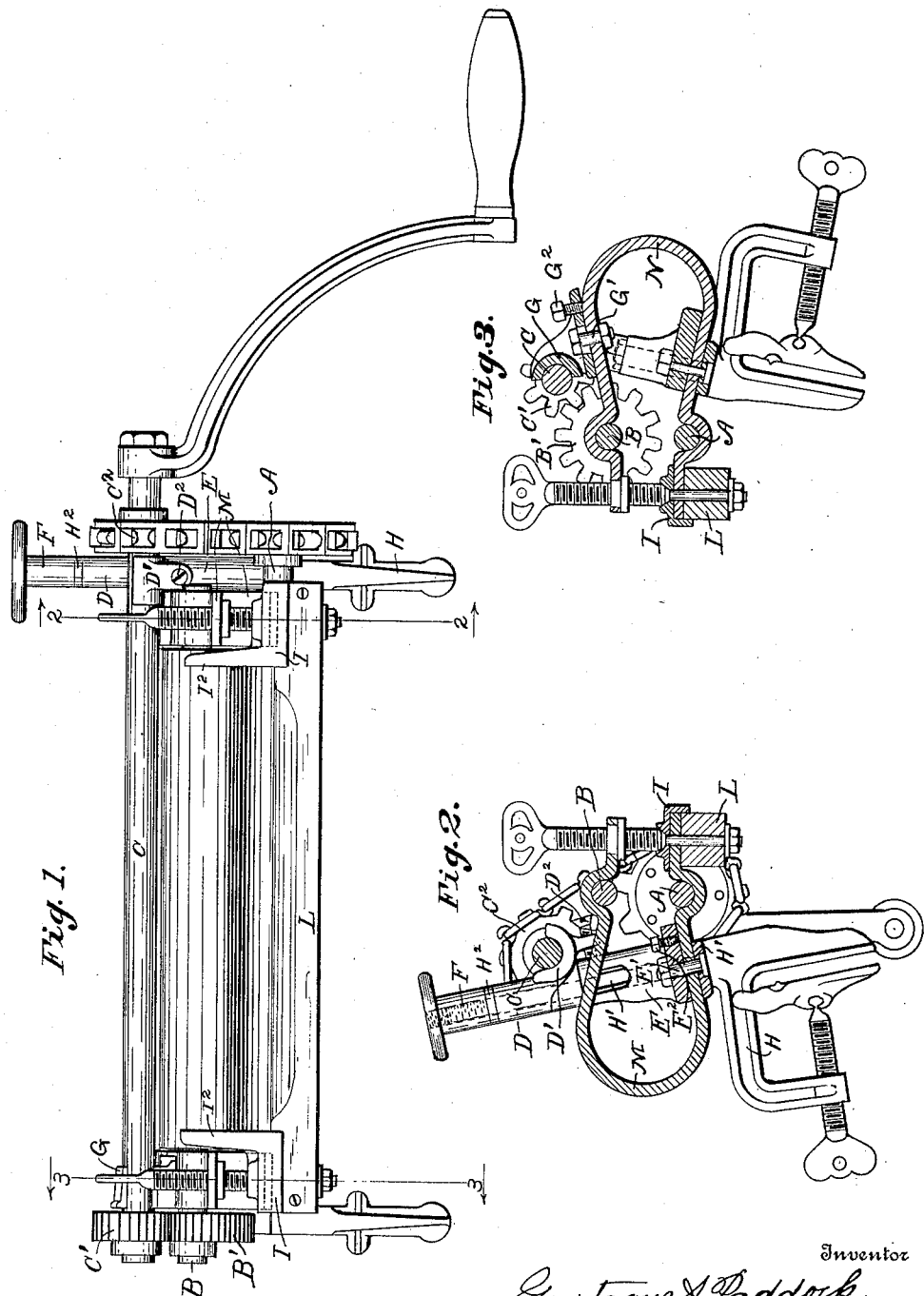
Witnesses
Chas. C. Miller
J. F. Wollenburg
Inventor
Gustavus A. Paddock

UNITED STATES PATENT OFFICE.

GUSTAVUS A. PADDOCK, OF BEAVER DAM, WISCONSIN.

CLOTHES-WRINGER.

1,007,964. Specification of Letters Patent. Patented Nov. 7, 1911.

Application filed January 29, 1907. Serial No. 354,617.

*To all whom it may concern:*

Be it known that I, GUSTAVUS A. PADDOCK, a citizen of the United States, residing at Beaver Dam, in the county of Dodge and State of Wisconsin, have invented a new and useful Improvement in Clothes-Wringers, of which the following is a specification.

My invention relates to improvements in clothes wringers in which the crank is attached to a separate drive shaft which is geared at one end to the lower roll shaft, and at the other end to the upper roll shaft.

Some of the objects of my improvement are to make said drive shaft easily removable from its bearings and from the frame. Also to furnish convenient means for adjustment of bearings when the gears are worn. To secure the bearings at the crank end so that the wringer will not vibrate when turning the crank as is the case when the bearing of a separate drive shaft is secured rigidly to the lower arm of a spring and both pivoted to a clamp. And to combine these features of construction with the U shaped springs and convenient means for holding the clothes away from the ends of the rolls, and also for taking the pressure off the rolls when the wringer is not in use, and cheaply secure a hand rest in front of the rolls in connection with these. I accomplish these objects by the mechanism illustrated in the accompanying drawing, in which:

Figure 1 is a front view of my improved wringer, Fig. 2 a view of the crank end of the same as seen from the line 2—2, Fig. 1, and Fig. 3 a view of the opposite end as seen from the line 3—3 Fig. 1.

A represents the lower roll shaft, B the upper roll shaft, and a separate drive shaft, one end of which is provided with a spur pinion, $C^1$, and the other end with a sprocket pinion, $C^2$, and a crank. Curved springs, M, and N, form the end pieces of the frame and furnish bearings for the roll shafts in the usual manner. To the lower arm of the spring M, and at its outside, a hollow upright, or sleeve, E, is secured by a bolt, $E^1$. A tub clamp, H, is pivoted in said sleeve, its upright rod, or shank, $H^1$, reaching past the upper arm of the spring, and through and past another sleeve, D, said sleeve being integral with a shaft bearing, $D^1$, in which the crank end of the drive shaft rests. The rod $H^1$ can be seen in Fig. 2, a slot or opening being left in the sleeve E. Said rod, together with that part of the clamp inside the tub, form a continuous upright adapted to be rigidly secured to the tub.

A hand rest, F, has screw threaded engagement with the upper part of the rod and thus holds the clamp in place. The clamp at the opposite end of the wringer is pivoted in a sleeve secured to the spring N. The spur pinion end of the drive shaft rests in a bearing, G, which is secured to the upper arm of the spring N, by a bolt $G^1$, which passes through the center of its base. A set screw, $G^2$, has bearing in the outer end of said base and is adapted to adjust said bearing. A sprocket wheel, $A^1$, is secured to the lower roll shaft and is connected with the sprocket pinion by a link belt, or drive chain. A washer, $H^2$, rests on the clamp rod, $H^1$, just under the hand rest, and if the chain becomes loose said washer can be placed under the sleeve D, and thus adjust the bearing $D^1$, and tighten the chain. Concave blocks, I, I, rest on the front ends of the springs and are prevented from turning by lips which rest against the ends of the springs, and are integral with clothes guards, $I^2$, which prevent the clothes going too near the ends of the rolls. The lower arms of the springs are connected in the rear of the rolls by a clothes apron in the usual manner, and in front by a bar, L, which forms a hand guard to prevent the fingers being caught between the rolls when feeding the wringer. Thumb screws have bearing in the upper arms of the springs and are adapted to take the pressure off the rolls when the wringer is not in use, their points resting on said blocks and bolts.

In the above described construction the bearing of the crank end of the drive shaft, instead of being connected directly to one of the springs, is independent thereof and is secured directly to the shank of the tub clamp. Therefore the bearing of the crank end of said shaft remains stationary when the crank is turned, thus preventing the rocking motion which is unavoidable when the shaft bearing is secured directly to the spring and both pivoted to the clamp.

I claim as my invention:

1. A clothes wringer comprising a curved spring at each end of roll shafts, their lower arms lying under and supporting the lower roll shaft, their upper arms furnishing pressure to the upper roll shaft, a shaft bearing secured to one of said upper arms, a separate drive shaft, one end thereof resting in said bearing and provided with a spur pinion, said pinion being in mesh with a spur wheel on the upper roll shaft, the other end of said drive shaft resting in a stationary but slidingly adjustable bearing and provided with a sprocket pinion, and a link belt connecting said sprocket pinion with a sprocket wheel on the lower roll shaft.

2. A clothes wringer comprising a lower roll-shaft supported by the lower arms of two U shaped springs, an upper roll-shaft held in place by the upper arms of said springs, an upright with its lower end adapted to stand inside the tub and be rigidly secured thereto, said upright being attached to the lower arm of one of said springs and reaching above the upper arm thereof, a shaft bearing supported on said upright above said upper arm, a drive shaft, one end of which is provided with a sprocket pinion and rests in said bearing, a link belt connecting said sprocket pinion with a sprocket wheel on the lower roll shaft, and a spur wheel connection between the opposite end of said drive shaft and the upper roll shaft.

3. A clothes wringer comprising a lower roll shaft resting in stationary bearings, an upper roll shaft resting in movable bearings, a shaft bearing pivotally supported on an upright rod and slidingly adjustable thereon, a separate drive shaft connected at one end by spur gear to the upper roll shaft, and at the other end by link belt and sprocket wheel gear to the lower roll shaft, the sprocket wheel end of said drive shaft resting in said pivotally supported bearing.

4. A clothes wringer comprising two U shaped springs, their lower arms lying under and supporting the lower roll shaft, their upper arms resting above and giving roll pressure to the upper roll shaft, a separate drive shaft provided at one end with a spur pinion and at the other end with a sprocket pinion and a crank, a shaft bearing secured to one of said upper arms, the spur pinion end of the drive shaft resting therein, the spur pinion being in mesh with a spur wheel on the upper roll shaft, a sprocket wheel on the lower roll shaft, a drive chain connecting said sprocket wheel with the sprocket pinion on the drive shaft, the bearing for that end of the shaft being supported by an upright standing between said chain and the lower arm of the spring at that end of the wringer and outside of said spring.

5. A clothes wringer comprising a lower roll-shaft in stationary bearings, an upper roll-shaft in vertically movable bearings, an upright adapted to reach inside the tub and be rigidly secured thereto, a shaft bearing with an opening through which said upright passes, a separate drive shaft, one end of which is provided with a sprocket pinion and rests in said bearing a hand rest above said bearing, and a link belt connecting said sprocket pinion with a sprocket wheel on the lower roll-shaft, the opposite end of said drive shaft having spur wheel connection with the upper roll shaft.

6. In a clothes wringer, an upright rod adapted to stand inside the tub and to reach above the upper roll shaft, a horizontal arm attached thereto and adapted to lie across the edge of the tub, and a bar depending from said arm, these three parts being combined in a tub clamp, a lower roll in stationary bearings, an upper roll in movable bearings, a shaft bearing adapted to clasp said rod and be slidingly supported thereon, a separate drive shaft, one end thereof resting in said bearing and provided with a sprocket pinion, a sprocket wheel on the lower roll shaft, and a drive chain connecting said sprocket pinion with said sprocket wheel, the opposite end of said drive shaft having spur wheel connection with the upper roll shaft.

7. In a clothes wringer, an upright rod extending above the upper roll shaft, a shaft bearing adjustably supported on said rod, a separate drive shaft, one end thereof resting in said bearing and supplied with a sprocket pinion, a sprocket wheel on the lower roll shaft, a drive chain connecting said sprocket pinion with said sprocket wheel, and a hand rest located above said bearing, encircling said rod, and having screw threaded engagement therewith.

GUSTAVUS A. PADDOCK.

Witnesses:
ALBERT KLATT,
A. B. CHANDLER.

---

Copies of this patent may be obtained for five cents each, by addressing the "Commissioner of Patents. Washington, D. C."